UNITED STATES PATENT OFFICE.

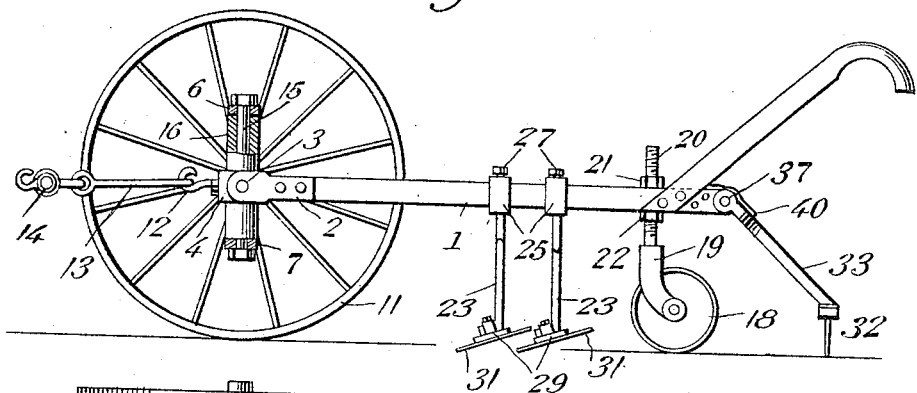

JOHN W. FUNK, JR., OF HEYWORTH, ILLINOIS.

SURFACE-CULTIVATOR.

1,122,899.  Specification of Letters Patent.  Patented Dec. 29, 1914.

Application filed September 19, 1911. Serial No. 650,220.

*To all whom it may concern:*

Be it known that I, JOHN W. FUNK, Jr., a citizen of the United States, residing at Heyworth, in the county of McLean and State of Illinois, have invented certain new and useful Improvements in Surface-Cultivators, of which the following is a specification.

This invention relates to cultivators and particularly to one designed for supplementing the work of the ordinary straddle-row cultivator for treating the plants after their advanced growth when the straddle-row cultivator could not be successfully operated without injury to the plants; certain objects of the present invention being to provide a cultivator which is capable of being driven between the rows for effectively exterminating the weeds and agitating the soil without greatly disturbing the mulch or moisture retaining substances contained in the soil.

Another object of the invention is to provide a cultivator which will include means whereby the agitating cutters or hoes can be adjusted so as to govern their penetration of the soil and thereby avoiding destruction or injury to the roots of the plants during cultivation.

In the drawing, forming a portion of this specification and in which like numerals of reference indicate similar parts in the several views:

Figure 1 is a side view of the cultivator with a part in section. Fig. 2 is a top plan view of the cultivator. Fig. 3 is a front view of the cultivator with the draft appliance removed. Fig. 4 is a perspective view of the cutter standard.

The cultivator comprises a longitudinal beam or cutter support 1 which is provided at its forward end with a casting 2 which is pivoted at 3 to the vertically adjustable collar 4. The arch frame 5 at the front of the cultivator comprises the substantially identically constructed superimposed arcuate members 6 and 7 which are provided with end horizontally disposed flanges 8. Stub axles 9 are secured at 10 between the said end flanges 8, and as illustrated, these axles have suitably mounted thereon the main supporting wheels 11. Clips 12 are secured to the arch frame by the bolts 10 and are pivotally connected with the rear ends of the draft bars 13. These draft bars are disposed in forwardly diverging relation and at their points of intersection they are connected with a singletree or the like 14.

The superimposed members 6 and 7 of the arch frame support a vertical rod 15 which is embraced by a sleeve 16. This sleeve and the rod 15 respectively form a brace for the central portion of the arch frame and combined they provide a vertical guide for the collar 4. A retaining device, such as the set screw 17, is employed for the purpose of holding the sliding collar 4 securely in its adjusted position on the guide. A caster-wheel 18 is mounted in the bracket 19 at the rear of the beam 1 and is provided with a vertical stem 20 which passes through the beam and which has threadedly mounted thereon clamping nuts 21 and 22 to engage the upper and lower sides of the beam respectively, so as to hold the caster-wheel in the required vertically adjusted position. Standards 23 are adjustable longitudinally on the beam 1. Two of such standards are shown herein and they are provided with oppositely offset portions 24 which hold the cutters of the standards in different planes with relation to the longitudinal axis of the machine. The standards are secured in any suitable well known manner to the guides or brackets 25 which are apertured at 26 to receive the beam. The brackets or guides are equipped with suitable devices 27 to engage the beam so as to hold the standards in their adjusted positions relatively. The lower ends of the standards are formed to provide arms 28 to which are secured the head members 29. The head members are suitably secured at 30 to the truncate triangular combined hoes and cutters 31, the ends of the hoes being extended beyond the ends of the heads 29 for effective contact with the ground. The arms 28 of the cutter standards extend downwardly and forwardly at an angle from the longitudinal axis of the machine so that the cutters are angularly disposed with reference to the ground.

By arranging the cutters as just described, their edge portions are presented for effective cutting engagement with the weeds and they also serve to thoroughly agitate or dig the soil without materially disturbing the same with relation to the plant. The latter is extremely desirable in a machine of the character described in that to the effective cultivation of corn, it is necessary that moisture retaining substances of the soil, such as mulch, be held against displacement from the plant.

A pulverizing rake 32 is located at the rear of the beam 1. It comprises preferably a bracket arm 33 which is pivoted at 34 to the beam. The opposite rail end of the bracket arm is secured to the rake head 35, the latter being provided with suitable rake teeth or tines 36 to effectively travel in the path of the cutters to thoroughly pulverize the soil. In effect, this pulverizing rake forms substantially a coverer to cover the furrows formed by the cutters. The pivot-bolt 37 of the rake arm is embraced by a coil spring 38 which has one of its terminals 39 bearing against the beam, while the other terminal 40 bears against the bracket arm 33 to hold the rake teeth yielding in contact with the soil. This spring also compensates for the adjustment of the frame vertically with respect to the surface of the ground as will be readily understood. The adjustment of the frame vertically, as described, permits of the cutters being adjusted for any required penetration of the soil and provides means whereby the required cutting and agitation of the soil can be obtained without injury to the roots of the plants.

I claim:

1. In a cultivator, a longitudinal frame member of polygonal cross section, a collar non-rotatable and longitudinally slidable on said member and having a lateral extension provided with a vertical disposed polygonal bore, a standard having a normally upright central portion provided with a lower end bent to form a projecting terminal inclined to the vertical, an earth working implement adjustable on said inclined terminal, the upper portion of said standard being bent horizontally laterally of said central upright portion and at an angle to said first-named or lower projecting terminal and said upper horizontal portion having a vertically disposed terminal of polygonal cross section fitting the vertical bore of said collar, substantially as described.

2. In an earth working mechanism, a wheeled frame including a frame member, a collar adjustable on said frame member, a standard depending from said collar having an upper cranked end mounted in said collar and provided with a lower inclined cranked end, and an earth working implement adjustably mounted on the lower inclined end of said standard, substantially as described.

In testimony whereof I affix my signature in presence of two witnesses,

JOHN W. FUNK, JR.

Witnesses:
W. W. WHITMORE,
W. C. HANSON.

Copies of this patent may be obtained for five cents each, by addressing the "Commissioner of Patents, Washington, D. C."